United States Patent [19]

Iwasa et al.

[11] Patent Number: 4,885,600
[45] Date of Patent: Dec. 5, 1989

[54] ZOOM MECHANISM FOR A ZOOM LENS IN CAMERAS AND THE LIKE

[75] Inventors: Kazuyuki Iwasa, Mitaka; Hirotsugu Nakazawa, Hachioji, both of Japan

[73] Assignee: Olympus Optical Co., Ltd., Japan

[21] Appl. No.: 164,568

[22] Filed: Mar. 7, 1988

[30] Foreign Application Priority Data

Mar. 10, 1987 [JP] Japan .................. 62-54884

[51] Int. Cl.$^4$ .......... G03B 3/10; G03B 5/00; G02B 7/02; G02B 15/00
[52] U.S. Cl. .............. 354/400; 354/195.12; 350/429; 350/255
[58] Field of Search ............ 354/400, 402, 195.1, 354/195.12; 350/255, 429; 358/227

[56] References Cited

U.S. PATENT DOCUMENTS

| | | | |
|---|---|---|---|
| 4,043,642 | 8/1977 | Hirose et al. | 350/429 |
| 4,472,033 | 9/1984 | Fukuhara et al. | 350/429 |
| 4,621,906 | 11/1986 | Hashimoto et al. | 350/429 |
| 4,697,891 | 10/1987 | Kawai | 350/429 |
| 4,728,980 | 3/1988 | Nakamura et al. | 354/195.12 X |
| 4,735,494 | 4/1988 | Makino et al. | 350/429 |
| 4,740,064 | 4/1988 | Kono et al. | 350/429 |
| 4,748,509 | 5/1988 | Otake et al. | 354/400 X |

Primary Examiner—W. B. Perkey
Attorney, Agent, or Firm—Louis Weinstein

[57] ABSTRACT

A zoom mechanism comprises a zoom system lens holding frame composed of at least one frame for changing its focal length by moving it in a direction of the optical axis, a focus system lens holding frame which moves together with the zoom system lens holding frame during a zooming operation and is held in the latter so as to be movable in a direction of the optical axis during a focusing operation, a detector for detecting movement of the zoom system lens holding frame from a predetermined reference position, a memory unit for storing a difference in position of the focus system lens holding frame from its normal position in relation to movement of the zoom system lens holding frame from the reference position as an amount of correction and for delivering a stored value corresponding to movement of the zoom system lens holding frame from the reference position a which movement is detected by the detector, and a controller for moving the focus system lens holding frame in relation to the zoom system lens holding frame in relation to the zoom system lens holding frame in a direction of the optical axis by an output of the memory unit.

7 Claims, 8 Drawing Sheets

FIG. IC
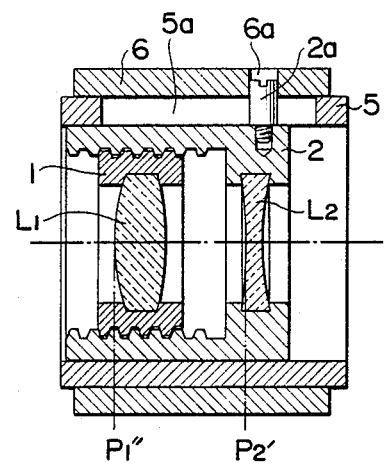
FIG. ID
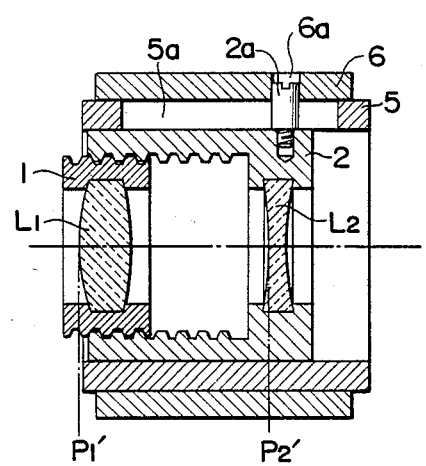

ZOOM MECHANISM FOR A ZOOM LENS IN CAMERAS AND THE LIKE

BACKGROUND OF THE INVENTION

The present invention relates to a zoom mechanism for a zoom lens in cameras and the like, and more particularly, to a zoom mechanism for a zoom lens in still cameras, video cameras and the like.

An example of a conventional zoom mechanism for a zoom lens in cameras and the like will be describedd hereinafter in connection with a zoom lens composed of two lens groups shown in FIGS. 5A and 5C and FIG. 6. FIGS. 5A and 5C respectively show conditions where a zoom lens is at its wide-end (the end of a wide anagle side) and is at its tele-end (the end of a telephoto side). FIG. 5B shows an amount of movement of lens groups L1 and L2 in a zooming operation. FIG. 6 is an expanded view of essential parts of the zoom mechanism shown in FIGS. 5A and 5C.

First and second lens groups L1 and L2 are fixed to respective first and second lens group holding frames 31 and 32. The first lens group holding frame 31 is threadably engaged with a rectilinear motion frame 33 by means of helicoid threads and the first lens group holding frame 31 is adapted to move in a direction of the optical axis of the first lens group by rotating the holding frame 31 relative to the rectilinear motion frame 33 in a focusing operation to change its focused position.

The rectilinear motion frame 33 and the second lens group holding frame 32 are movably fitted in a fixed frame 35. In addition, the rectilinear motion frame 33 and the second lens group holding frame 32 are respectively provided with driving pins 33a and 32a. The pins 33a and 32a pass through an elongated groove 35a which is provided on the fixed frame 35 in a direction of the optical axis such thata their circumferential rotations are prevented and fit in respective driving cam grooves 36a and 36b which are provided on an operating ring 36.

The fixed frame 35 is secured to a camera body (not shown).

With such arrangement, when the operating ring 36 is rotated in a direction shown by an arrow a in FIG. 6, the rectilinear motion frame 33 and the second lens group holding frame 32, whose rotations are limited by the fixed frame 35, move respectively along the cam grooves 36a and 36b in a direction of the optical axis from the condition showon in FIG. 5A to that showon in FIG. 5C with a zooming operation such that the first lens group L1 moves from a position P1 along a curve x to a position P1' and the second lens sgroup L2 moves from a position P2 along a curve y to a position P2' as shown in FIG. 5B.

As such, in a conventional zoom mechanism it is required that the rectilinear motion frame 33 and the second lens group holding frame 32 move separately along the respective cam grooves 36a and 36b during a zooming operation and the first lens group holding frame 31 moves in relation to the rectilinear motion frame 33.

Accordingly, the increase of the number of the number of lens groups necessitates the provision of complicated mechanisms.

SUMMARY OF THE INVENTION

It is an object of the present invention to provide a zoom mechanism for a zoom lens in cameras and the like which is adapted to move a number of lens groups with a simple structure.

According to the present invention, when a lens holding frame of a zooming system is moved, an amount of movement of the lens holding frame is detected by a detector, an amount of movement of a lens holding frame of a focusing system is determined by a value stored in a memory in accordance with the detected amount, and the focusing lens holding frame is moved by the determined amount relative to the zooming lens holding frame in a direction of the optical axis by a controller, so that spacing between the lens groups required for a zooming operation can be established by movement of the focusing lens group.

Consequently, it is possible to move complicated lens groups with a structure of a reduced number of lens group holding frames.

BRIEF DESCRIPTION OF THE DRAWINGS

FIGS. 1C and 1D are sectional views showing operational aspects of the zoom mechanism shown in FIG. 1A;

DETAILED DESCRIPTION OF PREFERRED EMBODIMENTS

Figure 1A:
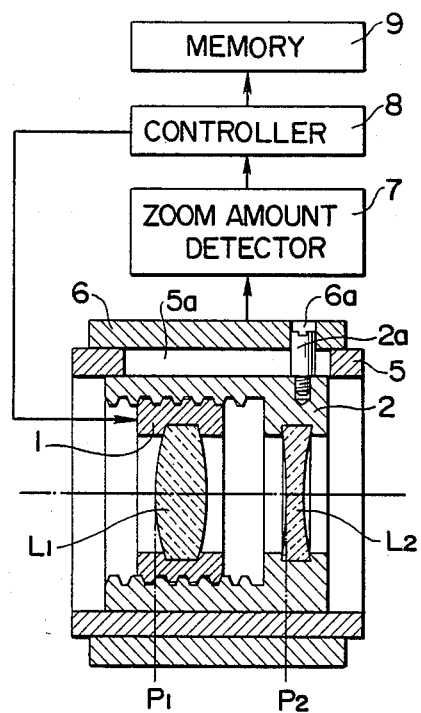
FIG. 1A is a section view of a first embodiment of a zoom mechanism for a zoom lens according to the present invention.
Figure 1B:
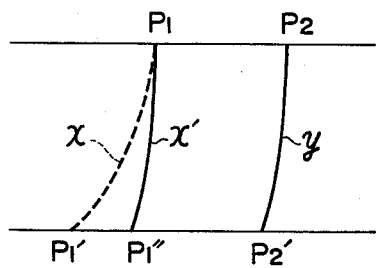
FIG. 1B is a diagram showing loci of movements of lens groups in the zoom mechanism shown in FIG. 1A.
Figure 2:
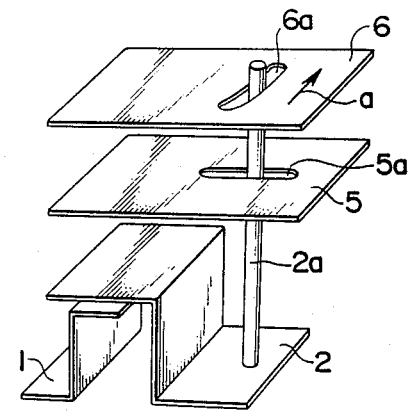
FIG. 2 is an expanded explanatory diagram of the zoom mechanism shown in FIG. 1A.
Figure 3A:
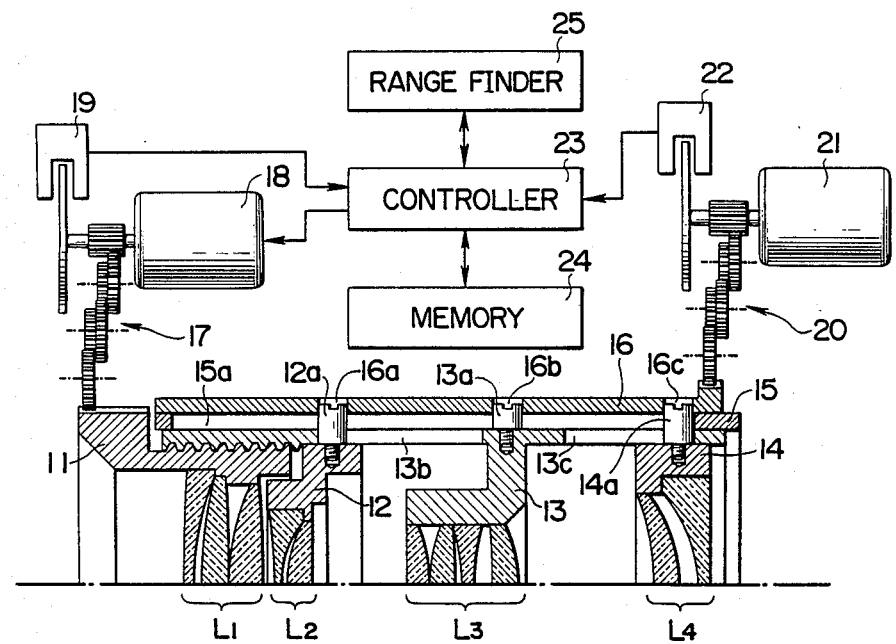
FIG. 3A is a sectional view of a second embodiment of a zoom mechanism for a zoom lens according to the present invention.
Figure 3B:
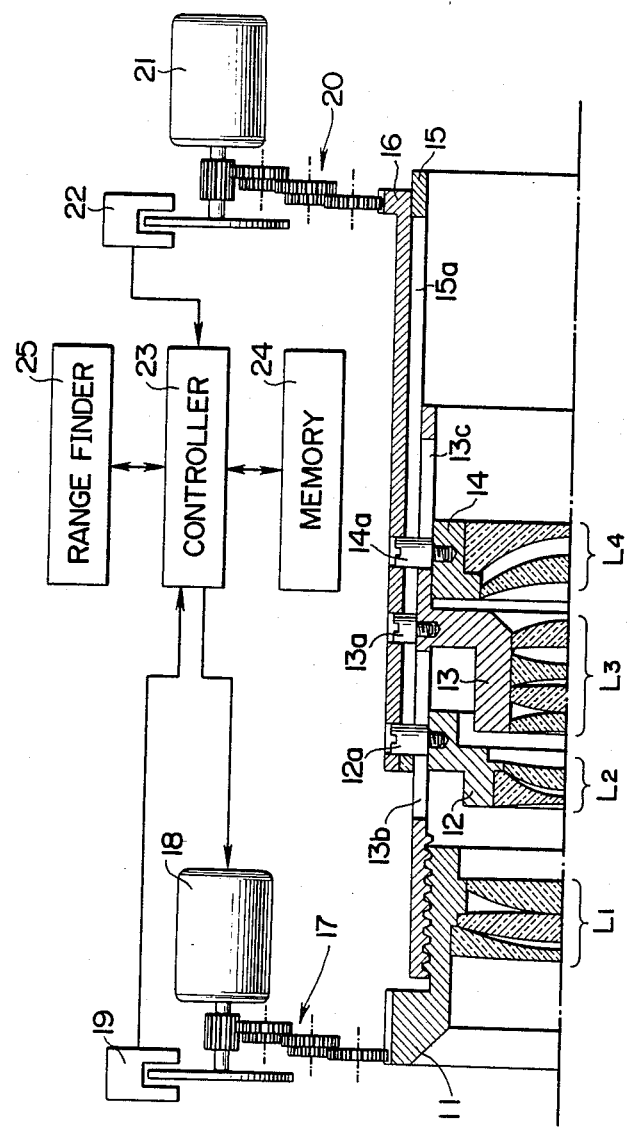
FIGS. 3B and 3C are sectional views showing operational aspects of the zoom mechanism shown in FIG. 3A.
Figure 3C:
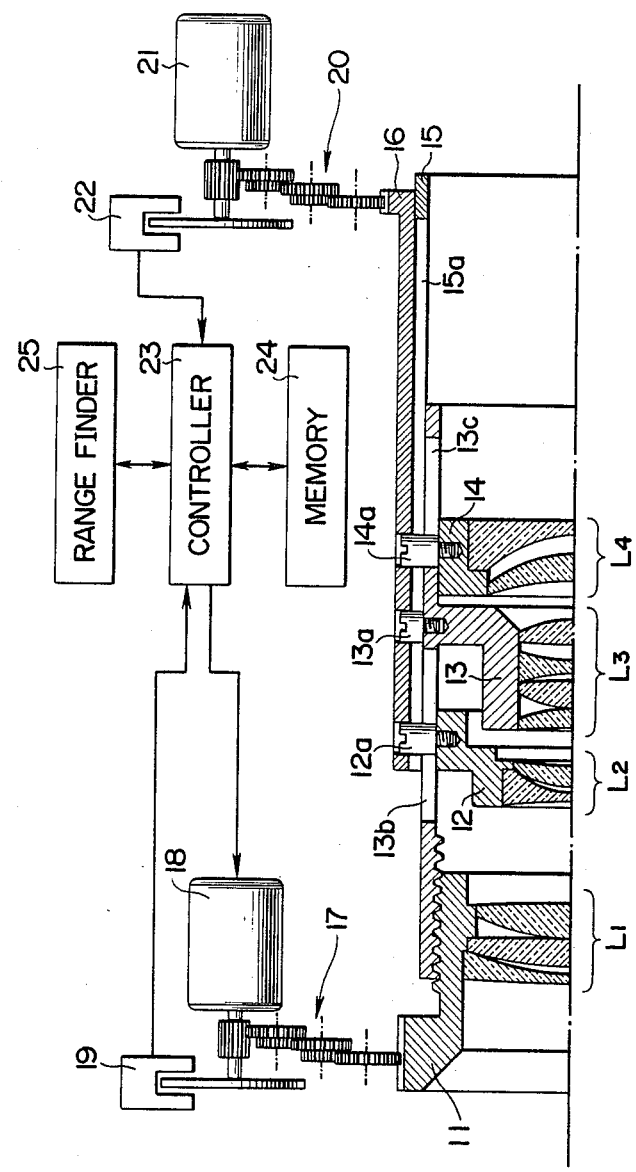
Figure 4:
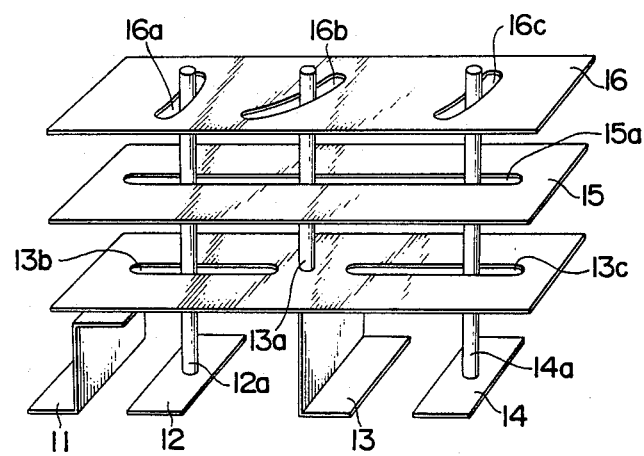
FIG. 4 is an expanded explanatory diagram of the zoom mechanism shown in FIG. 3A.
Figure 5A:
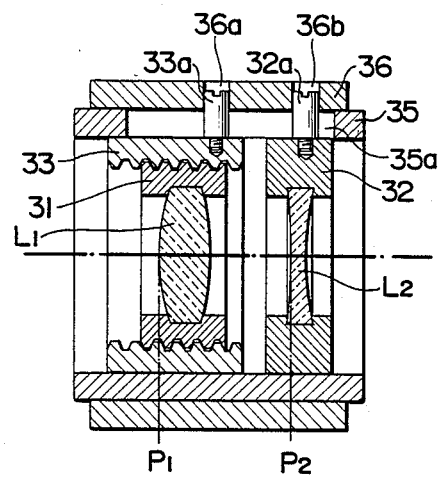
FIG. 5A is a sectional view of a conventional zoom mechanism for a zoom lens.
Figure 5B:
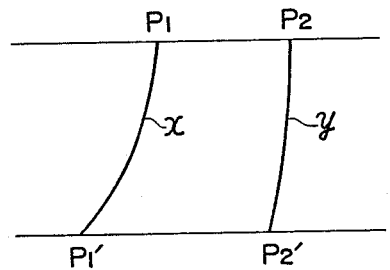
FIG. 5B is a diagram showing loci of movements of lens groups in the zoom mechanism shown in FIG. 5A.
Figure 5C:
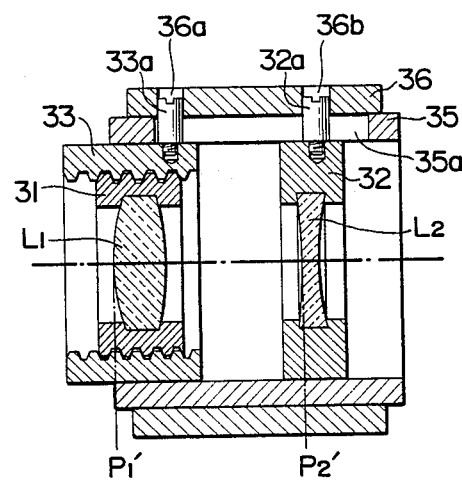
FIG. 5C is a sectional view showing an operational aspect of the zoom mechanism shown in FIG. 5A.
Figure 6:
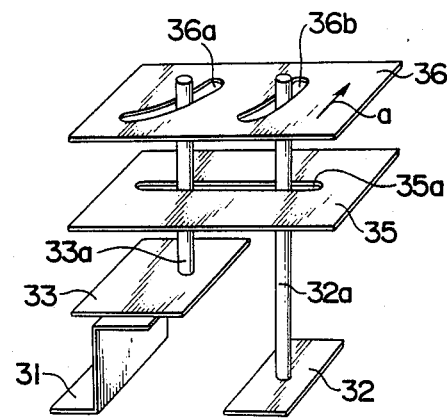
FIG. 6 is an expanded explantory diagram of the zoom mechanism shown in FIG. 5A.

In FIGS. 1A and 1D and 2, which show a first embodiment of the present invention, first and second lens groups L1 and L2 are fixed respectively to first and second lens group holding frames 1 and 2 and the first lens group holding frame 1 is threadably engaged with the second lens group holding frame 2 by helicoid threads. A pin 2a, which is provided on the second group holding frame 2, passes through an elongated groove 5a which s provided on a fixed frame 5 in a direction of the optical axis and fits in a cam groove 6a provided on an operating ring 6. Accordingly, the second lens group holding frame 2 moves along the cam groove 6a in a direction of the optical axis by rotating the operational ring 6 in the same manner as in the prior art operation. The distinction is that the first lens group holding frame 1 is not an independent lens frame but is threadably engaged with the second lens group holding frame by the helicoid threads. Consequently, members corresponding to the rectilinear motion frame 33, driving pin 33a and cam agroove 36a (see FIG. 5A) are eliminatedd, so that the structure can be made simpler. Specifically, when the operating ring 6 is rotated in a direction shown with an aarrow a (FIG. 2), the first lens group L1 moves integrally with the second lens group L2 in a direction of the optical axis from the condition shown in FIG. 1A to that shown in FIG. 1C such that the first and second lens groups L1 and L2 move respectively on lines x' and y from positions P1 and P2 to positions P1" and P2" shown in FIG. 1B.

In this condition, the focused position varies and the focal lengh does not vary. Therefore, a difference in movement between the first and second lens groups L1 and L2, which is to be set in accordance with an amount of the zooming operation, that is, a difference between a broken line x and the solid line y shown in FIG. 1B, is previously stored in a memory unit 9. On the other hand, a zoom amount detector 7 such as a position encoder is connected to the operating ring 6 to obtain a zoom amount corresponding to movement of the second lens group holding frame 2. This zoom amount is fed into a controller 8. The controller 8 reads out an amount of movement of the first lens group holding frame, which amount corresponds to the zoom amount to move the latter in a direction of the optical axis. Thereby, the first lens group L1 moves on the broken line x shown in FIG. 1B with rotation of the operating ring 6 in the direction of the aarrow a to reach the position P1' at the end of the zooming operation, which is shown in FIG. 1D. Thus, it is possible to change the focal length withou changing the focused position. As it will be understood that movement of the first lens group holding frame 1 is nothing but a focusing operation, it may be possible to simultaneously effect a focusing operation and correction for a zooming operation.

In a second embodiment of the present invention shown n FIGS. 3A to 3C and FIG. 4, a zoom mechanism is applied to a zoom lens comprising four lens groups L1 to L4. Each of the four lens groups L1 to L4 moves independently to change a focal length of the zoom lens. A focused position of the zoom lens is changed by moving the first lens L1 to perform the focusing operation.

The four lens groups L1 to L4 are fixed to respective four lens group holding frames 11 to 14. The first lens group holding frame 11 is threadably engaged with the third lens group holding frame 13 which is formed in an elongated tube form, by helicoid threads. The first lens group holding frame 11 rotates in relation to the third lens group holding frame 13 through a reduction gear train 17 for focusing by rotation of a focusing motor 18 and moves in a direction of the optical axis. A rotational output of the motor 18 is detected by a photointerrupter 19 for focusing. An output of the photointerrupter 19 is delivered to a controller 23.

Consequently, a rotational angle of the motor 18, that is, an amount of movement of the first lens group holding frame 11, is detected by the controller 23.

The second and fourth lens group holding frames 12 and 14 are fitte din the third lens group holding frame 13 so as to be slidable in relation to the third lens group holding frame 13 in a direction of the optical axis.

The third lens group holding frame 13 is fitted in a fixed frame 15 which is secured to a camera body (not shown) so as to be slidable in a direction of the optical axis. Driving pins 12a, 13a and 14a, which are provided on the respective second, third and fourth lens group holding frames 12, 13 nd 14, pass through an elongated groove 15a for rectilinear motion which is provided on the fixed frame 15 in a direction of the optical axis and fit respectively in cam grooves 16a, 16b and 16c which are provided on an operating ring 16. The pins 12a and 14a respectively pass through cut-off grooves 13b and 13c provided on the third lens group holding frame 13 so as not to prevent movement of the third lens group holding frame 13.

On the other hand, the operating ring 16 is connected through a reduction gear train 20 for zooming to a zooming motor 21 so as to be rotatable.

A rotational output of the motor 21 is detected by a photointerruper 22 in the same manner as the focusing motor 18. An output of the photointerrupter 22 is delivered to a controller 23, thereby the rotational angle being detected.

In addition, a memory unit 24 which previously stores a theoretical value of a difference in movement between the first and third lens group holding frames 11 and 13 in accordance with a focal length of the zoom lens and a range finder 25 which detects a range to an object being photographed are provided in operative relation to the controller 23.

In operation, when a zoom switch (not shown) is first operated, the zooming motor 21 is driven to rotate the operating ring 16. Since the pins 12a, 13a and 14a are limited in rotation by the elongated groove 15a, the holding frames 12, 13 and 14 move respectively along the cam grooves 16a, 16b and 16c in a direction of the optical axis. At this time, the first lens group holding frame 11 moves together with the third lens group holding frame 13 in the optical axis direction.

The controller 23 detects a zoom amount by the photointerrupter 22. The controller 23 reads out the zoom amount, that is, a theoretical value of a difference in movement between the first and third lens group holding frames 11 and 13 which value corresponds to the focal length, from the memory unit 24 and adds the zoom amount to an amount of movement of a focusing group, that is, the first lens group holding frame 11 which amount corresponds to information of a range to an object being photographed which is derived fro mthe range finder 25. Thereupon, the motor 18 is rotated to move the first lens group holding frame 11 by an amount calculated in the controller 23. Thus, the zooming nd focusing operations are simultaneously completed. After the photographing operation is completed, the first lens group holding frame 11 is again moved to the point at infinity by the motor 18.

The theoretical value of a difference in movement between the first and third lens group holding frames 11 and 13 which are previously stored in the memory unit 24 may be prepared to every required focal length. When the amount of data is limited because of a limited capacity of the memory unit 24, the theoretical values may be obtained by interpolating prepared data, thus improving their accuracy. By way of example, in the condition where amounts of movements b1 and b2 of the first lens group holding frame 11 which amounts respectively correspond to focal lengths f1 and f2 are stored in the memory unit 24, when an amount of movement bs thereof is obtained as the result of a range finding operation, an amount of final movement b of the first lens group holding frame 11 corresponding to a focl length for satisfying the relation $f1 \leq f0 \leq f2$ is represented as follows.

$$b = bs + b1 + (b2-b1)(f1-f0)(f1-f2)$$

Further, when an amount of movement corresponding to a focal length is represented by an approximate equation, it will be sufficient to store only coefficients of the equation. For example, when the approximate equation is given as follows, $$b = bs + Af0^2 + Bf0 + C$$

it may be sufficient to store only constants A, B and C. Although, in the second embodiment, the first lens group holding frame 11 moves together with the third lens group holding frame 13 by rotating the operating ring 16, the first lens group holding frame 11 may be moved together with the second or the fourth lens group holding frame. Alternatively, the lens group for focusing may be other lens groups. In addition, this is applicable to zoom lenses such as a two lens group structure or three lens group structure. While the zooming operation in this embodiment is performed by the electric drive, it may be possible by a manual operation.

While in the embodiment an amount of the zooming operation and an amount of movement of the focusing lens is detected by using the photointerrupter, it will be understood that a zoom amount and movement of the first lens group holding frame relative to the second one may be detected by obtaining an amount of rotation of the operating ring or the first lens group holding frame from a reference position by using a position encoder in place of the photointerrupter.

What is claimed is:

1. A zoom mechanism for a zoom lens in a camera and the like, comprising:
    said zoom lens having a predetermined optical axis;
    a frame for holding a zoom system lens composed of at least one frame for changing its focal length by moving said frame in a direction of the optical axis;
    a frame for holding a focus system lens which frame moves together with said zoom system lens holding frame during a zooming operation and is held in the latter so as to be movable in a direcion of the optical axis during a focusing operation;
    detector means for detecting movement of said zoom system lens holding frame from a predetermined position;
    memory means for storing a difference in position of said focus system lens holding frame from its normal position in relation to movement of said zoom system lens holding frame from said predetermined position as an amount of correction and for delivering a stored value corresponding to movement of said zoom lens holding frame from said predetermined position which movement is detected by said detector means; and
    controller means for moving said focus system lens holding frame in relation to said zoom system lens holding frame in a direction of the optical axis in accordance with an output of said memory means.

2. A zoom mechanism for a zoom lens according to claim 1 further comprising a zoom operating ring for moving the zoom mechanism holding frame, in which
    said detector means comprises a position encoder for detecting rotation of said zoom operating ring from a reference position which ring moves said zoom system lens holding frame.

3. A zoom mechanism for a zoom lens according to claim 2 in which
    said zoom operating ring has a driving cam groove for moving said zoom system lens holding frame in a direction of the optical axis and is driven by a motor for a zooming operation.

4. A zoom mechanism for a camera according to claim 1 wherein said memory means stores a limited number of stored values and wherein said controller means comprises means for obtaining values between the stored values by interpolating appropriate ones of the stored values.

5. A zoom mechanism for a zoom lens in a camera, comprising:
    said zoom lens having a predetermined optical axis;
    a frame for holding a zoom system lens composed of at least one frame for changing its focal length by moving said frame in a direction of the optical axis;

6. A zoom mechanism for a camera according to claim 5 in which said controller means further comprises a motor for rotating said focus system lens holding frame and a photointerrupter for generating signals responsive to rotation of said motor, said photointerrupter signals being representative of the rotation of said motor.

7. A method for operating a zoom lens assembly comprising a zoom system lens held within the zoom system lens frame and a focus system lens held within the focus system lens frame, said operating method comprising the steps of:
    simultaneously moving said zoom system lens frame and said focus system lens frame to obtain a desired zoom condition;
    detecting the movement of one of said frames relative to a predetermined position to obtain a difference value;
    providing a plurality of compensation values each representing an amount for adjusting the focus sytem lens holding frame from its normal position in relation to movement of the zoom system lenss holding frame from said predetermined position to obtain a focus condition;
    selecting the adjustment value based on the difference value determined; and
    moving only said focus lens system frame by an amount according to the selected compensation value.

* * * * *

UNITED STATES PATENT AND TRADEMARK OFFICE
CERTIFICATE OF CORRECTION

PATENT NO. : 4,885,600

DATED : December 5, 1989

INVENTOR(S) : Iwasa et al.

It is certified that error appears in the above-identified patent and that said Letters Patent is hereby corrected as shown below:

TITLE PAGE:

In the Abstract, line 17, "a" should be a --,--

Column 1, line 11, "describedd" should be --described--

Column 1, line 15, "anagle" should be --angle--

Column 1, line 37, "thata" should be --that--

Column 1, line 49, "showon" should be --shown-- (both occurrences)

Column 2, line 45, "explantory" should be --explanatory--

Column 2, line 58, "s" should be --is--

Column 3, line 2, "eliminatedd" should be --eliminated--

Column 3, line 4, "aarrow" should be --arrow--

Column 3, line 12, "lengh" should be --length--

UNITED STATES PATENT AND TRADEMARK OFFICE
CERTIFICATE OF CORRECTION

PATENT NO. : 4,885,600

DATED : December 5, 1989

INVENTOR(S) : Iwasa et al.

It is certified that error appears in the above-identified patent and that said Letters Patent is hereby corrected as shown below:

Column 3, line 60, "fitte din" should be --fitted in--

Column 4, lines 42-43, "fromthe" should be --from the--

Column 4, line 46, "nd" should be --and--

Column 4, line 65, "focl" should be --focal--

Column 6, after line 27 add the following paragraphs to Claim 5:

--a frame for holding a focus system lens which frame moves together with said zoom system lens holding frame during a zooming operation and is held in the latter so as to be movable in a direction of the optical axis during a focusing operation;
  detector means for detecting movement of said zoom system lens holding frame from a predetermined position;

UNITED STATES PATENT AND TRADEMARK OFFICE
CERTIFICATE OF CORRECTION

PATENT NO. : 4,885,600

DATED : December 5, 1989

INVENTOR(S) : Iwasa et al.

It is certified that error appears in the above-identified patent and that said Letters Patent is hereby corrected as shown below:

memory means for storing a difference in position of said focus system lens holding frame from its normal position in relation to movement of said zoom system lens holding frame from said predetermined position as an amount of correction and for delivering a stored value corresponding to movement of said zoom lens holding frame from said predetermined position which movement is detected by said detector means;
a range finder for detecting the range of an object for generating a signal;
controller means for moving said focus system lens holding frame in relation to said zoom system lens holding frame in a direction of the optical axis by movement of said focus system lens holding frame in relation to said zoom system lens holding frame, which movement corresponds to an output from said range finder and said memory means.--

Column 6, line 49, "lenss" should be --lens--

Signed and Sealed this

Seventh Day of May, 1991

Attest:

HARRY F. MANBECK, JR.

Attesting Officer

Commissioner of Patents and Trademarks